Feb. 4, 1969  R. T. ROBINETTE  3,425,523
VENTILATED ROTOR WITH VIBRATION DAMPENER
Filed June 12, 1967
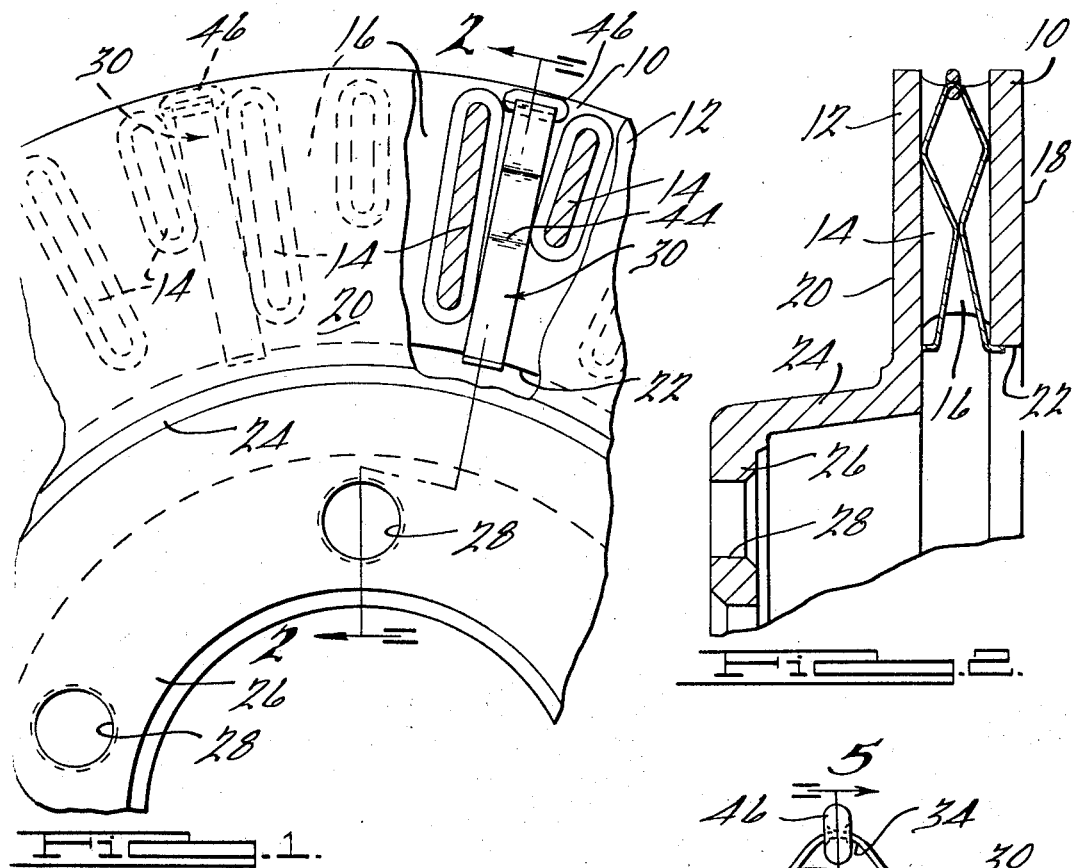
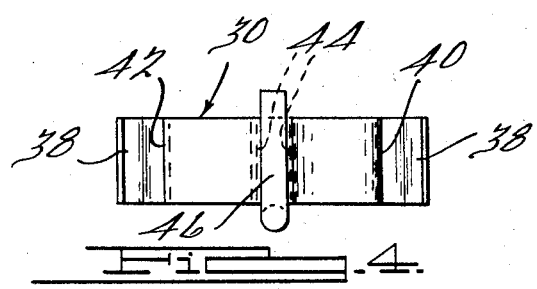
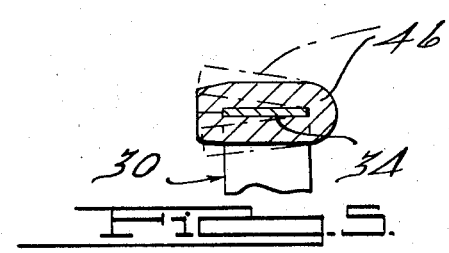
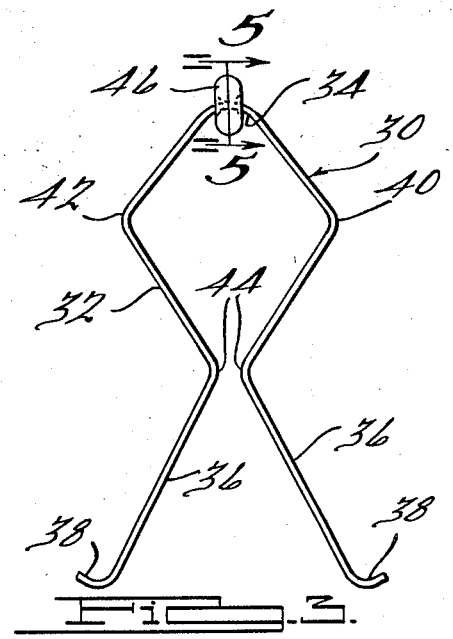
INVENTOR.
Richard T. Robinette
BY
Harness, Dickey & Pierce
ATTORNEYS.

United States Patent Office 3,425,523
Patented Feb. 4, 1969

3,425,523
VENTILATED ROTOR WITH VIBRATION DAMPENER
Richard T. Robinette, St. Clair Shores, Mich., assignor to Kelsey-Hayes Company, a corporation of Delaware
Filed June 12, 1967, Ser. No. 645,356
U.S. Cl. 188—218        9 Claims
Int. Cl. F16d 65/10; F16f 7/00; B60b 13/00

ABSTRACT OF THE DISCLOSURE

A resilient partially compressible vibration dampener member composed of a resilient wire formed with a loop portion having two legs integrally affixed thereto and projecting in divergent relationship therefrom. The dampener member is adapted to be removably disposed in one or a plurality of locations in radially extending open-ended apertures formed between the side walls and radially extending vanes of a rotor of a disk-type brake.

Background of the invention

Various techniques have heretofore been used or proposed for use for eliminating or substantially dampening the audible vibrations produced in wheel braking systems during a braking cycle. This problem has been particularly pronounced in connection with automobile wheel brakes and, specifically, disk-type brakes. This problem is manifested by the production of an objectionable noise as the result of the frictional coaction between the brake shoe and brake disk causing an audible vibration of the brake disk at certain periods of vibration.

One solution to this problem is disclosed in United States Patent No. 3,292,746, granted Dec. 20, 1966, entitled, "Vibration Dampener for Disk Brakes," which is assigned to the same assignee of the present invention. The vibration dampener device disclosed in the aforementioned United States patent comprises a circular continuous spring steel wire having a plurality of circumferentially spaced loop portions which are adapted to be inserted in radially extending apertures formed between the spaced walls and vanes of a brake disk. In accordance with this construction, the dampener device must be installed from the inside of a brake disk, and variations or corrections in the dampener characteristics thereof cannot be conveniently accomplished without at least a partial disassembly of a vehicle wheel assembly.

It has been noted that the tendency for a brake to squeal or emit audible noise during a braking action will vary even among brakes of identical design due to differences in the degree of wear and the condition of the brake shoes. For this reason, it is particularly desirable that vibration dampener devices provide a high degree of versatility and flexibility in use, enabling suitable corrective action in the field as may be necessary to alleviate any brake squeal problem that may arise. The vibration dampener member comprising the present invention provides the necessary flexibility and versatility permitting quick and simple field installation, necessitating only minimal labor and time, and providing the requisite corrective action for alleviating a brake squeal problem. In addition, the dampener device of the present invention also provides a quick and simple means for affixing balancing weights to the rotational components of the brake assembly for enhancing its rotational balance.

Summary of the invention

The foregoing and other objects and advantages of the present invention are achieved by a vibration dampener member which is adapted to be removably disposed in the radially extending open-ended apertures formed between the opposing side walls and circumferentially spaced radially-extending vanes of a disk-type brake. The specific number of such individual dampener members employed can be varied consistent with the intensity of the audible vibration tendencies of the brake assembly and can be changed in position so as to provide for optimum vibrational dampening characteristics. Each individual vibration dampener member comprises a resilient wire formed with a substantially closed loop having a bight portion and a pair of leg portions integrally affixed to the ends of the loop at a point opposite to the bight portion and which legs extend outwardly in relatively divergent relationship from each other. The leg portions are formed with engaging means thereon for interlocking the vibration dampener member within a radial aperture of the brake disk, thereby preventing inadvertent outward movement thereof in response to the imposition of centrifugal forces on the dampener member during rotation of the disk. When installed, the loop portion of the dampener member is in a partially compressed condition and in firm contact against the side walls of the brake disk. Each of the vibration dampener members can be separately installed and removed either from the outer or inner ends of the radial apertures, providing therewith increased simplicity and versatility. The vibration dampener members also serve as an anchoring site for weights of a selected magnitude which can readily be attached to the bight portion of the loop of the dampener member in order to place the brake assembly in rotational balance.

Additional benefits and advantages of the present invention will become apparent upon a reading of the description of the preferred embodiments taken in conjunction with the accompanying drawing.

Brief description of the drawing

FIGURE 1 is a fragmentary enlarged side elevational view, partly in section, of a brake disk incorporating a vibrational dampener member in interlocked relationship thereon;

FIGURE 2 is a transverse sectional view through the brake disk and dampener member shown in FIGURE 1 and taken substantially along the line 2—2 thereof;

FIGURE 3 is a plan view of a vibrational dampener member having a weight removably attached to the bight section thereof;

FIGURE 4 is a top view of the dampener member shown in FIGURE 3; and

FIGURE 5 is a fragmentary magnified sectional view through the weight and dampener member shown in FIGURE 3 and taken substantially along the line 5—5 thereof.

Description of the preferred embodiments

Referring now in detail to the drawing and as may be best seen in FIGURES 1 and 2, a ventilated brake disk of the type of which the present invention is applicable comprises a pair of spaced-apart circular side walls 10, 12, which are interconnected by a plurality of circumferentially spaced radially extending walls or vanes 14. The inner surfaces of the side walls 10, 12 and the vanes 14 define therebetween a plurality of radially extending apertures 16, through which cooling air is normally drawn for cooling the brake disk during rotation thereof. The outer annular faces 18 and 20 of the side walls 10 and 12, respectively, are adapted to be disposed in frictional sliding contact against brake shoes (not shown) which exert a clamping force on the brake disk during a braking action. The side wall 10 is formed with an inner annular edge 22, while the side wall 12 is integrally connected to a hub 24 formed with an annular flange 26 having a plurality of circumferentially spaced bores 28 therethrough. The brake disk is adapted to be secured by means of suitable studs or bolts (not shown) extending through the bores 28 to the flange of a wheel hub in a manner well known in the art.

A vibration dampener member 30, constructed in accordance with the preferred embodiments of the present invention and as may be best seen in FIGURES 3–5, comprises an integrally formed resilient member composed of a flat ribbon of spring steel. The member 30 is formed with a substantially closed loop 32 which is of a generally rhombic or diamond-shaped configuration and is formed with a bight portion 34 having a gentle arcuate curvature. A pair of legs 36 are integrally connected to the ends of the loop 32 at a point opposite to the bight portion 34 and extend in divergent outward relationship relative to each other. The end portions of each of the legs 36 are formed withoutwardly extending hooks 38 which are provided for the purpose of interlocking the dampener member with the brake disk when in an installed position.

The vibrational dampener member 30 is shown in FIGURE 3 in the normal unstressed condition in which the transverse width of the loop 32, as measured across the side corners 40, 42 thereof, is greater than the width between the opposed inner surfaces of the side walls of the brake disk. The transverse expanse of the lower portions of the legs 36 similarly is greater than the distance between the inner surfaces of the side walls of the brake disk. Installation of the dampener member within one of the apertures 16 of the brake disk is simply achieved by thrusting the member between the side walls either through the outer or the inner openings of the radial apertures as viewed in FIGURE 2, effecting a partial compression of the member to a configuration as shown in FIGURE 2. In the installed position, the side corners 40, 42 of the loop are in firm resilient contact against the inner surfaces of the side walls 10 and 12, while the hook 34 on one of the legs 36 underlies the annular edge 22 of the side wall 10, effecting an interlocking of the member and preventing inadvertent outward radial movement thereof in response to the imposition of centrifugal forces thereon during rotation of the brake disk. Each of the legs 36 is flexed to a less divergent position when in the installed position in response to the abutting contact of opposed inner corners 44 defining the open end of the loop.

As previously mentioned, the number of dampener members installed can readily be varied consistent with the severity and nature of the audible vibrations produced in any specific brake assembly. Generally, the use of from four to six dampener members per brake disk disposed at substantially equal arcuate increments has satisfactorily alleviated brake squealing tendencies in most instances. As shown in FIGURE 1, two such members are installed at circumferentially spaced intervals to provide optimum vibrational dampening action.

In addition to serving as a dampener for vibrations induced in the brake disk, the dampener members 30 also serve as a means for securing weights, such as a balancing weight 46, on the brake disk in order to achieve optimum rotational balance and avoid wheel tramp. As best seen in FIGURES 3–5, the balancing weight 46 is of a split U-shaped configuration and preferably is composed of a readily deformable dense metal such as lead. The balancing weight is simply installed around the bight section of the loop of the dampener member by sliding the weight over the bight section through the open end thereof to a position as shown in phantom in FIGURE 5 and thereafter clinching or otherwise deforming the weight in firm bearing contact around the wire ribbon. It will be apparent that the dampener members not only provide a convenient site for securing the balancing weights to the brake disk, but also substantially facilitate the balancing of rotor members due to the increased flexibility in locating the weight peripherally along the rotor, as well as enabling simple and quick changes in the magnitude of the weights secured to the dampener member.

While it will be apparent that the invention herein disclosed is well calculated to fulfill the objects above stated, it will be appreciated that the invention is susceptible to modification, variation and change.

What is claimed is:

1. In a disk brake including a rotor having a pair of axially spaced side walls interconnected by a plurality of circumferentially spaced radially extending vanes defining therebetween a plurality of open-ended radially extending apertures, the improvement comprising a vibration dampener member adapted to be removably disposed in one or more of the apertures, said dampener member comprising a resilient wire formed with a substantially closed loop having a bight portion and a pair of leg portions integrally affixed to the ends of said loop opposite to said bight portion and extending outwardly and in relative divergent relationship therefrom, said loop adapted to be disposed in resilient partially compressed relationship and in contact against the opposed side wall surfaces of an aperture of the rotor, said leg portions formed with engaging means thereon for engaging the rotor preventing unwanted movement of said dampener member outwardly of a aperture.

2. The vibration dampener member as defined in claim 1, wherein said resilient wire is in the form of a flat ribbon of a width less than the width of the apertures.

3. The vibration dampener member as defined in claim 1, wherein said leg portions are disposed in the same plane as the plane of said loop.

4. The vibration dampener member as defined in claim 1, wherein said loop is of a substantially rhombic configuraion.

5. The vibration dampener member as defined in claim 1, wherein said dampener member is oriented in an aperture with said loop disposed radially outwardly and said legs disposed radially inwardly.

6. The vibration dampener member as defined in claim 1, wherein said engaging means comprise oppositely extending hook portions formed along the outer end portion of each said leg portion.

7. The vibration dampener member as defined in claim 6, wherein one of said hook portions is adapted to underlie an annular edge of one of the side walls of the rotor preventing the outward movement of said dampener member in response to centrifugal forces imposed thereon.

8. The vibration dampener member as defined in claim 1, further characterized by including a weight of a preselected magnitude removably affixed to said bight portion for balancing the rotor.

9. The vibration dampener member as defined in claim 8, wherein said weight is of a U-shaped deformable material and is deformed into engaging clamping relationship around said bight portion.

References Cited

UNITED STATES PATENTS

| 3,011,828 | 12/1961 | Karig | 301—5 |
| 3,280,637 | 10/1966 | Ealey et al. | 301—5 |
| 3,368,654 | 2/1968 | Wegh et al. | 188—218 |

GEORGE E. A. HALVOSA, Primary Examiner.

U.S. Cl. X.R.

74—573; 301—5